United States Patent [19]

McKee

[11] 4,148,501
[45] Apr. 10, 1979

[54] SUSPENSION SYSTEM

[75] Inventor: Laird W. McKee, La Jolla, Calif.

[73] Assignee: Rohr Industries, Incorporated, Chula Vista, Calif.

[21] Appl. No.: 864,211

[22] Filed: Dec. 27, 1977

[51] Int. Cl.² .............................................. B60G 11/26
[52] U.S. Cl. .................................. 280/711; 267/63 R; 267/65 A; 280/712
[58] Field of Search ............... 280/702, 706, 711, 712, 280/713, 698, 693; 267/65 A, 66, 63 R

[56] References Cited

U.S. PATENT DOCUMENTS

| | | | |
|---|---|---|---|
| 2,496,893 | 2/1950 | Smith | 267/65 A |
| 2,869,891 | 1/1959 | Venditty | 280/713 |
| 2,941,817 | 6/1960 | Benson | 280/713 |
| 2,955,842 | 10/1960 | Stump | 267/66 X |
| 2,960,333 | 11/1960 | McGavern | 267/65 B |
| 2,995,355 | 8/1961 | Stump | 280/711 X |
| 3,083,982 | 4/1963 | DeJong | 267/65 A X |
| 3,477,738 | 11/1969 | Manning | 280/693 |

Primary Examiner—Joseph F. Peters, Jr.
Assistant Examiner—Donn McGiehan
Attorney, Agent, or Firm—Patrick J. Schlesinger; Frank D. Gilliam

[57] ABSTRACT

An improved suspension system for a vehicle having a body-supporting frame and a wheel-supported axle. A pair of air spring units are laterally spaced adjacent the opposite ends of the axle. Each of these air spring units has a lower air spring seat, an air spring body, and an upper air spring seat. The lower air spring seat members are attached to the top to the axle. A top mounting plate secures the upper air spring seat members to the frame. The top mounting plates are sloped inwardly such that their inward side lies at a vertical height lower than their outward side. The center of the upper air spring seat members are laterally offset in an inboard direction with respect to the center of the lower spring seat members. The air spring units have a bump stop member mounted on the lower spring member within the air spring body and the top of the bump stop has at its center an apex with the top surface of the bump stop sloping downwardly therefrom in a plane that extends inboard and a plane that extends outboard. The suspension system also has a lateral rod having its one end pivotally secured to the axle and its other end pivotally secured to the frame. The pivot points at the opposite ends of the lateral rods both lie on a substantially horizontal axis that is below the lower mounting surface of the air springs.

8 Claims, 2 Drawing Figures

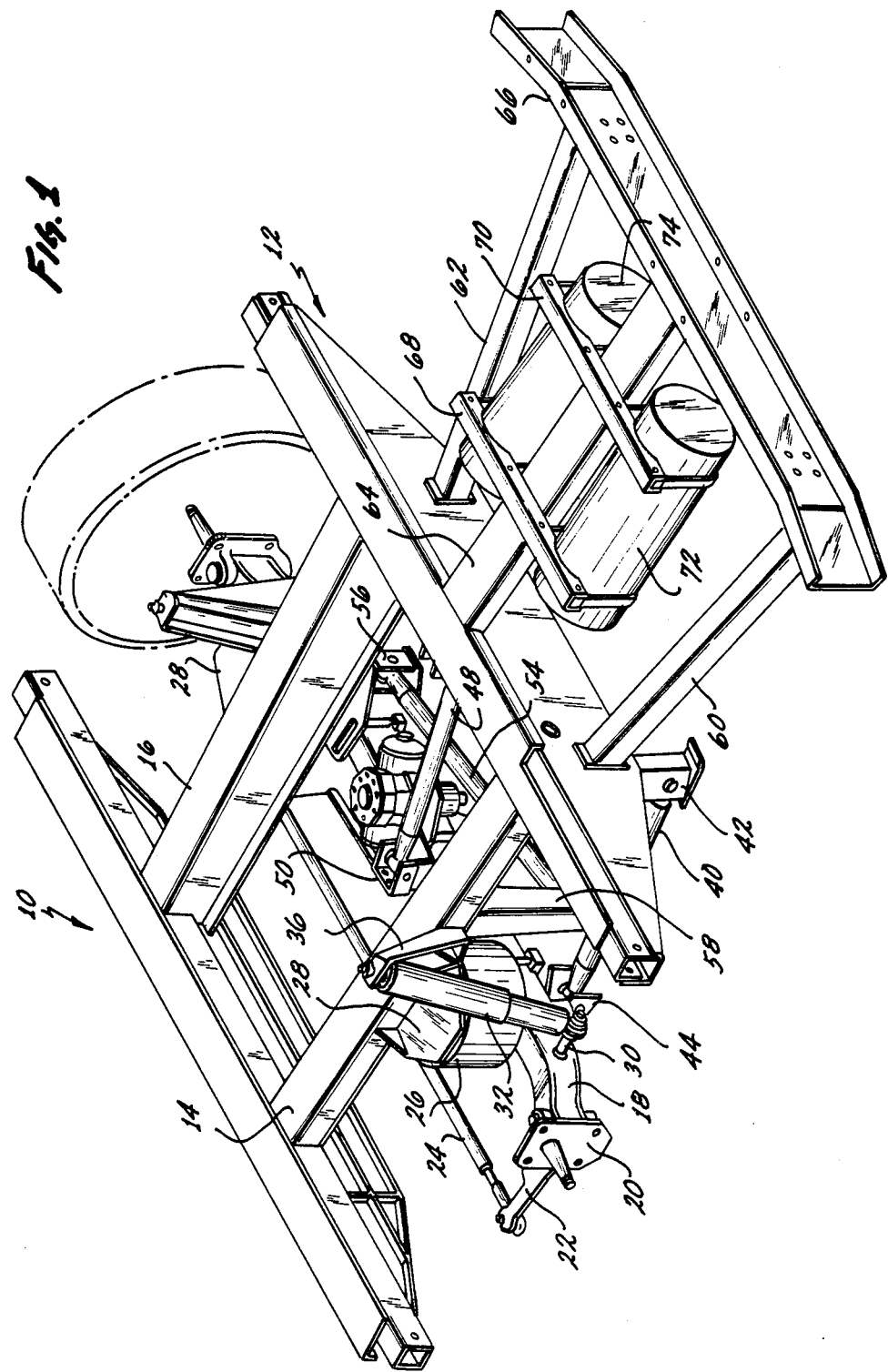

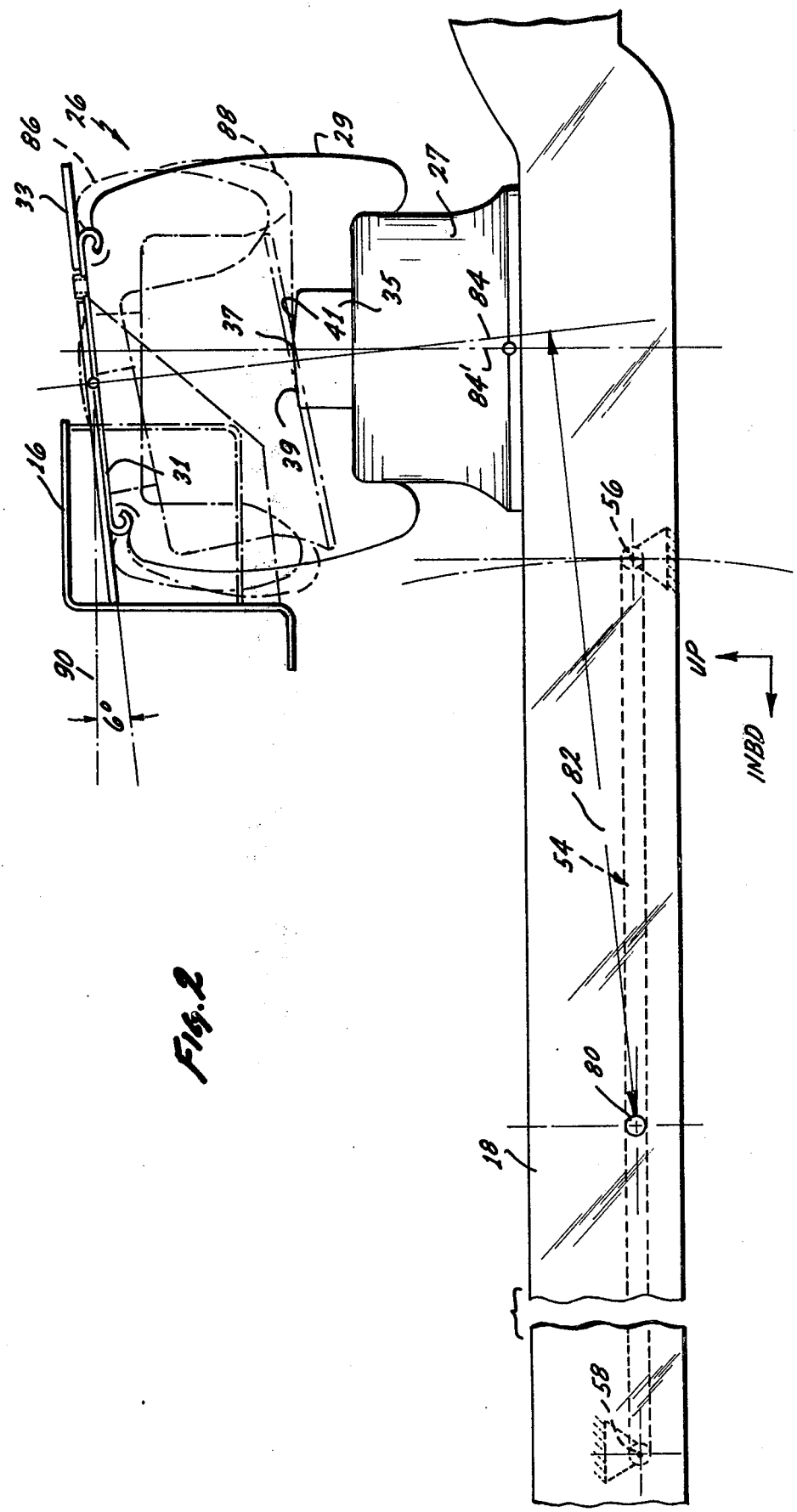

SUSPENSION SYSTEM

BACKGROUND OF THE INVENTION

The invention relates to a suspension system for a vehicle having a body-supporting frame and a wheel-supported axle, and more particularly to a suspension system utilizing air springs.

In the past, vehicle suspension system utilizing air springs have been well known. A common example of subject systems is illustrated in U.S. Pat. No. 2,874,957. In it, the bottom of the air spring is attached to the top of the vehicle axle and the top of the air spring is attached to a mounting plate secured to the vehicle frame. The suspension system described in this patent is basically concerned with providing a constant riding level for the vehicle.

Another type of vehicle suspension utilizing air springs is illustrated in U.S. Pat. No. 3,961,826. The system described in this patent has been designed to provide a system that is simple and economically to manufacture and which is of a relative lightweight construction, whereby substantial savings in vehicle weight can be realized.

A third vehicle suspension system is illustrated in U.S. Pat. No. 3,964,764 that utilizes air springs. In the system illustrated, the support for the bottom of the air springs has been spaced above the axle so that lateral rods may be pivotally attached to a mounting bracket between the top of the axle and the bottom of the air spring. The opposite end of the lateral rod is pivotally secured to a mounting bracket extending down from the frame of the vehicle.

It is an object of the invention to provide a novel suspension system that utilizes air springs in a customary location between the body-supporting frame and the wheel-supported axle that will noticeably increase the roll stiffness characteristics of the suspension system.

It is also an object of the invention to provide a novel vehicle suspension system utilizing air springs that significantly improve the quality of ride of the vehicle.

It is a further object of the invention to provide a novel vehicle suspension system that utilizes air springs mounted on the top of the axle and having a lateral rod pivotally connected to the frame at one end and the axle at its other end, and wherein the pivot points for the end of the lateral rods lie on horizontal axis below the lower mounting surface of the air springs.

It is an additional object of the invention to provide a novel vehicle suspension system that is economical to manufacture and also to install.

SUMMARY OF THE INVENTION

The novel vehicle suspension system has evolved from critical changes that have been made to an ordinary vehicle suspension system. The ordinary vehicle suspension system before modifications would have had a body-supporting frame, a wheel-supported axle, and a pair of air spring units each having their lower surfaces attached to the axle adjacent opposite ends of the axle. The top end of the air springs would normally have been attached to the body-supporting frame by a top plate whose attaching surface would have been substantially in a horizontal plane. To this basic structure, Applicant has taken the top mounting plate and tilted it inwardly so that the inboard edge of the top mounting plate is lower than its outboard edge. A tilting angle of 6° has been found to substantially improve the roll stiffness of the suspension system. Additionally, the lateral rod for the suspension system has been positioned at a specific location. The ends of the lateral rods are pivotally secured to mounting brackets attached to the body-supporting frame and the wheel-supported axle respectively. The pivot point at the opposite ends of the lateral rod are so located so that the axis about which the ends pivot are substantially horizontal and also lie beneath the top of the lower mounting surface of the air springs. As a result, the roll center $A_1$ (which is determined by the intersection of the center line of the springs and the axis of the lateral rod) of the suspension system also lies along the longitudinal axis that lies in a horizontal plane below the lower mounting surface of the air springs. The center of the upper air spring seat members are laterally offset in an inboard direction with respect to the center of the lower spring seat members.

The roll stiffness is determined by the following formula: $roll\ stiffness = k \times d^2/2$. In this formula, k is the spring rate and $d^2$ is equal to the effective spring center distance. The effective spring center distance is measured from the roll center through the closest point on the axis of the air spring. Under the prior art, this axis would have extended vertically downwardly from the center of the lower spring seat member. With Applicant's novel suspension system, the inwardly tilting of the top mounting plate causes the tilted axis of the air spring to move outside of the normal vertical axis of the previous distance when the roll center is located below the springs. This effectively increases the spring center dimensions and since this dimension is squared in the roll stiffness formula, a substantial increase in vehicle ride performance is obtained.

Another important feature of the novel vehicle suspension system resides in the configuration of the bump stop found within the body of the air spring. The bump stop has an apex at its center and the top surfaces of the bump stop slope downwardly therefrom both inboard and outboard. As a result of this inclined inboard surface, whenever the vehicle is subjected to a parallel jounce of the wheels on the axle, the inboard downwardly sloping surface of the bump stop will contact the top of the upper spring seat member with their surfaces substantially parallel. When the vehicle suspension system undergoes a cock-bump situation (that is when one wheel is raised to its upper limit while the opposite wheel has been dropped to its lower limit), the outwardly sloping surface of the bump stop member will contact the upper spring seat member with their surfaces substantially parallel at contact. In the prior art vehicle suspension system, the bump stop member had a substantially flattop surface and when the suspension system underwent the parallel jounce condition or the cock-bump condition, thrust forces produced on the bump stop resulted in acccelerated deterioration or failure of the bump stop member. The ideal situation is to have the contact surface of the bump stop member contact the bottom of the upper spring seat member as close to perpendicular as possible. This situation is produced substantially more often with the novel contour of the bump stop member of Applicant's device. Where there is a single tire jounce situation, the contacts of the bump stop to the upper spring seat member is made at the apex of the bump stop member. An additional result obtained by the lower roll center permitted is that a reduced amount of scrub of the tires is produced. It results in longer tire life and reduced lateral accelerations induced into the frame.

DESCRIPTION OF THE DRAWINGS

FIG. 1 is a perspective view illustrating the environment into which Applicant's novel vehicle suspension system is installed; and FIG. 2 is a partial forward elevation schematic view illustrating the relationship of the body-supporting frame, the air spring, and the wheel-supported axle.

DESCRIPTION OF THE PREFERRED EMBODIMENTS

The improved vehicle suspension system will now be described by referring to FIGS. 1 and 2. In FIG. 1, the front end of the vehicle is seen to have a body-supporting frame comprising cross beam assemblies 10 and 12 that are connected together by longitudinal beams 14 and 16. The wheel-supported axle lies transversely to beams 14 and 16 and between the two cross beam assemblies. At each end of the axle is a wheel mount 20, having a tie rod arm 22, and the two tie rod arms are connected together by a tie rod 24.

A pair of laterally spaced air bags 26, have their bottom mounted on axle 18 and their top attached to top plate 28. The specific structure of the air springs will be discussed later. On each end of the axle is a forwardly extending stud that is connected to the lower end of a shock absorber 32 with its top end being secured to a mounting bracket 36 attached to the longitudinal beam 14. Other structure of the suspension system are radius rods 40 and 48. Radius rod 40 is attached to the vehicle structure at its forward end by a mounting bracket 42 extending downwardly from cross beam assembly 12 and the other end of the radius rod is pivotally attached to the bracket 44 extending forwardly from the axle. Radius rod 48 is similarly pivotally attached to the axle and frame. Bracket 50 is secured to the axle 18 and the forward end of radius rod 48 would be pivotally attached to a bracket (not shown) extending downwardly from cross beam assembly 12. The lateral rod 54 is also pivotally attached at its end to both the axle and the frame. Its one end is pivotally attached to the axle by bracket 56. The opposite end of the lateral rod is pivotally attached to a bracket 58 extending downwardly from longitudinal beam 14.

Extending forwardly from cross beam assembly 12 are laterally spaced front bumper support beams 60 and 62 and central air reservoir assembly support beam 64. A front bumper frame 66 is attached to the front end of the support beams 60 and 62. Support brackets 68 and 70 extend transverse to beam 64 for the purpose of mounting air reservoirs 72 and 74.

The specific structure of the air spring unit 26 and the manner in which they are attached to the frame and axle of the vehicle are best illustrated in FIG. 2. Each air spring unit has a lower spring seat member or base 27 that is mounted directly on top of the axle 18. The air spring unit has a body 29 and an upper spring seat or clamp ring 31. The upper spring seat member 31 is secured to the frame by top mounting plate 33 that is tilted inboard such that its inboard edge is lower than its outboard edge. Within the air spring body is a bump stop member 35 having an apex 37 and parallel jounce contact surface 39 and cock-bump contact surface 41.

The roll center 80 is located below the top of the axle 18 and this point is found by finding the intersection point of an axis extending down the center line of the springs and an axis extending between the two pivot points of the lateral rod 54. The effective spring center distance 82 is measured between the roll center and the shortest perpendicular distance to an axis 84 drawn from the center of the upper spring seat member 31 through the center of the bottom of the air spring body 29. Under previous vehicle suspension structure, this perpendicular axis would have resulted in a line like 84 that is substantially perpendicular to the top of axle 18. It can therefore be seen that by tilting the top mounting plate 33 inwardly, the effective spring center distance has been increased. Phantom line 86 indicates the shape the air spring body 29 would take when subjected to a single tire jounce. Phantom line 88 indicates a configuration the air spring body 29 would take under a parallel jounce condition. Numeral 90 identifies a horizontal plane that passes through the center of the upper spring seat member 31.

What is claimed is:

1. An improved suspension system for a vehicle including a body-supporting frame and wheel-supported axle, comprising:
   a pair of air spring units each having a lower air spring seat, an airspring body, an upper spring seat, and a bump stop member mounted on said lower spring seat within said air spring body, said bump stop having an apex at its center and the top surfaces slope downwardly therefrom, the inboard slope having substantially the same angle as the inner surface of said upper spring seat,
   said air spring units having their lower air spring seats attached to said axle adjacent opposite ends of said axle, and
   means for mounting the top of said air spring units to said frame at an angle such that the inboard side of the top of each air spring unit lies at a vertical height lower than the outboard side of the top of each air spring unit.

2. An improved suspension system as recited in claim 1, wherein the lower air spring seats of the air spring units are attached to the top of said axle.

3. An improved suspension system as recited in claim 1, wherein the means for mounting the top of said air spring units to said frame comprises a top mounting plate that is secured to said frame with its inboard edge lower than its outboard edge.

4. An improved suspension system as recited in claim 3, wherein said top mounting plates slope inwardly at at least a 6 degree angle to a horizontal plane passing through the top mounting plate.

5. An improved suspension system as recited in claim 1, wherein the center of the upper air spring seats are laterally offset in an inboard direction with respect to the center of the lower spring seats.

6. An improved suspension system as recited in claim 1, further comprising a lateral rod having its one end pivotally secured to said axle and its other end pivotally secured to the frame.

7. An improved suspension system as recited in claim 6, wherein the pivot point of the lateral rod connection to the frame lies on a substantially horizontal axis located below the lower mounting surface of the air springs.

8. An improved suspension system as recited in claim 7, wherein the pivot point of the lateral rod connection to the axle lies on a substantially horizontal axis located below the lower mounting surface of the air springs.

* * * * *